US005352736A

United States Patent [19]

Stofko, Jr. et al.

[11] Patent Number: 5,352,736

[45] Date of Patent: Oct. 4, 1994

[54] TRANSPARENT LIQUID ABSORBENT MATERIALS

[75] Inventors: John J. Stofko, Jr., St. Paul, Minn.; Mohammad Iqbal, Austin, Tex.

[73] Assignee: Minnesota Mining and Manufacturing Company, St. Paul, Minn.

[21] Appl. No.: 48,456

[22] Filed: Apr. 16, 1993

Related U.S. Application Data

[62] Division of Ser. No. 603,787, Oct. 24, 1990, Pat. No. 5,219,928.

[51] Int. Cl.$^5$ .............................................. C08G 63/48

[52] U.S. Cl. .......................................... 525/57; 525/60; 525/61; 525/100; 525/101; 525/102; 525/903; 428/331; 428/447

[58] Field of Search ..................... 525/57, 60, 61, 100, 525/101, 102, 903; 428/331, 447

[56] References Cited

U.S. PATENT DOCUMENTS

| | | | |
|---|---|---|---|
| 4,300,820 | 11/1981 | Shah | 523/108 |
| 4,369,229 | 1/1983 | Shah | 428/421 |
| 4,389,513 | 6/1983 | Miyazaki | 525/381 |
| 4,503,111 | 3/1985 | Jaeger et al. | 428/195 |
| 4,547,405 | 10/1985 | Bedell et al. | 427/256 |
| 4,554,181 | 11/1985 | Cousin et al. | 427/261 |
| 4,555,437 | 11/1985 | Tanck | 428/212 |
| 4,578,285 | 3/1986 | Viola | 427/209 |
| 4,592,951 | 6/1986 | Viola | 428/323 |
| 4,604,443 | 8/1986 | Chang et al. | 525/61 |
| 4,636,805 | 1/1987 | Toganoh et al. | 428/210 |
| 4,642,247 | 2/1987 | Mouri et al. | 428/143 |
| 4,696,974 | 9/1987 | Sulc et al. | 525/100 |
| 4,725,648 | 2/1988 | Fujimoto et al. | 525/100 |
| 4,741,969 | 5/1988 | Hayama et al. | 525/57 |
| 4,812,519 | 3/1989 | Gillette | 525/101 |
| 4,904,732 | 2/1990 | Iwahara et al. | 525/100 |
| 4,952,643 | 8/1990 | Hirose et al. | 525/476 |
| 5,134,198 | 7/1992 | Stofko, Jr. et al. | 525/205 |
| 5,192,617 | 3/1993 | Stofko, Jr. et al. | 525/205 |
| 5,208,092 | 5/1993 | Iqbal | 428/195 |

FOREIGN PATENT DOCUMENTS

| | | |
|---|---|---|
| 0232040 | 8/1987 | European Pat. Off. . |
| 0233703 | 8/1987 | European Pat. Off. . |
| 0365307 | 4/1990 | European Pat. Off. . |
| 0297108 | 8/1990 | European Pat. Off. . |
| 61135788 | 6/1986 | Japan . |
| 61230978 | 10/1986 | Japan . |
| 61235182 | 10/1986 | Japan . |
| 61235183 | 10/1986 | Japan . |
| 61261089 | 11/1986 | Japan . |
| 61293886 | 12/1986 | Japan . |
| 62032079 | 2/1987 | Japan . |
| 2174259 | 7/1987 | Japan . |

*Primary Examiner*—Melvyn I. Marquis
*Assistant Examiner*—Randy Gulakowski
*Attorney, Agent, or Firm*—Gary L. Griswold; Walter N. Kirn; David L. Weinstein

[57] ABSTRACT

A liquid-absorbent composition comprising (a) a polymeric matrix component comprising crosslinked silanol moieties, and (b) a liquid-absorbent component comprising a water-absorbent polymer, preferably a water-soluble polymer. This composition is capable of forming liquid-absorbent, semi-interpenetrating polymeric networks, which are capable of absorbing significant quantities of those liquids that are solvents for the uncrosslinked portion of the network without loss of physical integrity and without leaching or other forms of phase separation. The compositions of this invention provides polymeric matrices which result in transparent coatings capable of providing improved combinations of ink absorption and durability, while at the same time retaining transparency and being amenable to the types of processing commonly used in producing transparent graphical materials.

18 Claims, No Drawings

TRANSPARENT LIQUID ABSORBENT MATERIALS

This is a division of application No. 07/604,787 filed Oct. 24, 1990 now Pat. No. 5,219,928.

BACKGROUND OF THE INVENTION

1. Field of the Invention

This invention relates to transparent materials that are capable of absorbing liquids, and, more particularly, to materials that can be used as ink-receptive layers for transparent imageable materials.

2. Discussion of the Art

Transparent materials that are capable of absorbing significant quantities of liquid, while maintaining some degree of durability and transparency, are useful in contact lenses, priming layers for aqueous coatings, fog-resistant coatings, and transparent imageable materials for use in mechanized ink depositing devices, such as pen plotters and ink-jet printers. Transparent imageable materials are used as overlays in technical drawings and as transparencies for overhead projection. It is desirable that the surface of liquid absorbent materials for use in transparent graphical applications be tack free to the touch even after absorption of significant quantities of ink.

During normal use of pen plotters and ink-jet printers, the inks used in such machines are exposed to open air for long periods of time prior to imaging. However, even after such exposure to air, the ink must still function in an acceptable manner, without deterioration, and, in particular, without loss of solvent. In order to meet this requirement, ink formulations typically utilize solvents of very low volatility, such as water, ethylene glycol, propylene glycol, and other like solvents. Inks such as these, which contain water and water-miscible solvents, will hereinafter be called aqueous inks, and the solvents used therein will hereinafter be called aqueous liquids. Materials that are receptive to aqueous liquids will hereinafter be called hydrophilic compositions.

Because of the low volatility of aqueous solvents, image drying by means of evaporation is very limited. In the case of imaging onto paper, a significant amount of the solvent diffuses into the sheet. Because of the fibrous nature of paper, drying by diffusion occurs very rapidly, and the surface appears dry to the touch within a very short time. In the case of imaging onto polymeric film, some means of absorbing aqueous solvents is needed if satisfactory image drying is to occur.

Compositions useful as transparent liquid absorbent materials have been formed by blending a liquid-insoluble polymeric material with a liquid-soluble polymeric material. The liquid-insoluble material is presumed to form a matrix, within which the liquid soluble material resides. Examples of such blends are the transparent water absorbent polymeric materials disclosed in U.S. Patent Nos. 4,300,820 and 4,369,229, wherein the matrix forming polymer is a terpolymer comprised of hydrophobic monomeric units, hydrophilic monomeric units, and acid-containing monomeric units, with the water-soluble portions of the compositions being polyvinyl lactams.

Other examples of blends comprising water-soluble and water-insoluble polymeric compositions are disclosed in European Patent Application No. EP 0 233 703, wherein water-insoluble acrylic polymers having acid functionality are blended with polyvinyl pyrrolidone for use as ink-receptive layers on films to be imaged by ink-jet printers or pen plotters.

A problem that frequently arises in the formulation of polymer blends is the incompatibility of the polymers being blended. It is well-known that polymeric materials having widely differing properties generally tend to be incompatible with one another. When attempts are made to blend polymers that are incompatible, phase separation occurs, resulting in haze, lack of transparency, and other forms of nonhomogeneity.

Compatibility between two or more polymers in a blend can often be improved by incorporating into the liquid-insoluble matrix-forming polymer chains monomeric units that exhibit some affinity for the liquid-soluble polymer. Polymeric materials having even a small amount of acid functionality, as in the patents cited previously, are more likely to exhibit compatibility with polyvinyl lactams. Generally, the compatibility of polymers being blended is improved if the polymers are capable of hydrogen bonding to one another.

A second form of incompatibility noted in using blends of liquid-absorbent polymers is the incompatibility of the matrix forming insoluble polymer with the liquid being absorbed. For example, if the liquid being absorbed is water, and if the water-insoluble polymers are hydrophobic, some inhibition of water absorption ability can be expected. One method of overcoming this difficulty is to utilize hydrophilic matrix polymers that are not water soluble at the temperatures at which they are to be used, though they may be water soluble at a different temperature. In U.S. Pat. No. 4,503,111, ink-receptive coatings comprising either polyvinyl alcohol or gelatin blended with polyvinyl pyrrolidone are disclosed. Both polyvinyl alcohol and gelatin, being water-insoluble at room temperature, are able to act as matrix forming polymers for these coatings, and the coatings are quite receptive to aqueous inks. However, the coatings do exhibit a tendency to become tacky, either because of imaging, or because of high humidity.

It therefore becomes clear that while blends of soluble and insoluble polymers may be useful as liquid absorbent compositions, they suffer major limitations in liquid absorption ability and in durability.

SUMMARY OF THE INVENTION

This invention provides a liquid-absorbent composition comprising (a) a polymeric matrix component comprising crosslinked silanol moieties, and (b) a liquid-absorbent component comprising a water-absorbent polymer, preferably a water-soluble polymer. This composition is capable of forming liquid-absorbent, semi-interpenetrating polymeric networks, hereinafter called SIPNs. The SIPNs disclosed herein are polymeric blends wherein at least one of the polymeric components is crosslinked after blending to form a continuous network throughout the bulk of the material, and through which the uncrosslinked polymeric components are intertwined in such a way as to form a macroscopically homogeneous composition. It has been found that SIPNs of this invention are capable of absorbing significant quantities of those liquids that are solvents for the uncrosslinked portion of the SIPN without loss of physical integrity and without leaching or other forms of phase separation. In cases where the SIPNs are initially transparent, they remain transparent after absorption of significant quantities of liquids.

The nature of the crosslinking used in the formation of the matrix components of the SIPNs is such that it combines durability in the presence of the liquids encountered during use with compatibility toward the absorbent component. The nature of the crosslinking should also be such that it does not interfere with potlife and curing properties that are associated with commonly available methods of processing. More particularly, crosslinking should be limited to the matrix component of the SIPN, and should not cause phase separation or other inhomogeneity in the SIPN.

The present invention provides polymeric matrices which result in transparent coatings capable of providing improved combinations of ink absorption and durability, while at the same time retaining transparency and being amenable to the types of processing commonly used in producing transparent graphical materials.

DETAILED DESCRIPTION

The crosslinked portion of the SIPN will hereinafter be called the matrix component, and the soluble portion will hereinafter be called the absorbent component.

The matrix component of the SIPN of the present invention uses crosslinkable polymers incorporating silanol groups therein. Such silanol groups can be provided as part of the monomeric units used in the formation of the polymer, or they can be grafted into the polymer after the formation of the polymeric backbone.

Matrix polymers useful for the present invention can be conveniently prepared by grafting alkoxysilane pendant groups onto a suitably selected backbone polymer, followed by hydrolysis of the alkoxysilane pendant groups to silanols. The grafting of additional hydrophilic pendant groups to the backbone polymer is also desirable. Backbone polymers that are particularly suitable for the present invention are those containing monomeric units from maleic anhydride.

A convenient method of carrying out the grafting reactions involves: (1) dissolving a backbone polymer having maleic anhydride sites in a suitable solvent; (2) preparing solutions of compounds that will be reacted with the backbone polymer to produce a polymer having the desired grafted-on pendant groups; and (3) reacting the solutions of step (2) with the backbone polymer solution.

Compounds that have been found particularly suitable in providing graftable pendant groups for polymers having maleic anhydride sites are those containing primary amine groups, wherein the amine groups react with the maleic anhydride groups to form grafting sites. Silanol pendant groups can be provided by treating the solution of backbone polymer with a solution of an aminoalkoxysilane to graft on alkoxysilane pendant groups, which can subsequently be hydrolyzed by adding water to the solution.

The grafting of silane and other hydrophilic pendant groups onto a backbone polymer having maleic anhydride sites preferably proceeds according to the following reaction:

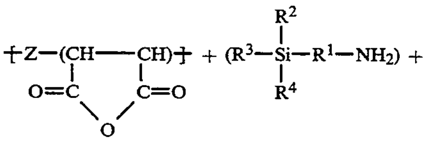

(a) (b)

-continued

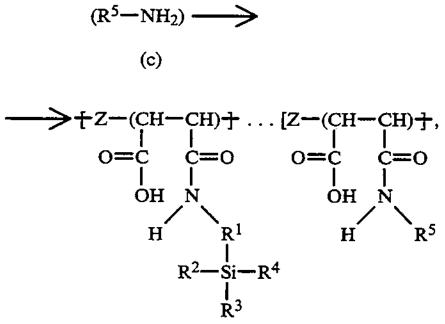

(c)

(pendant group 1) (pendant group 2)

(d)

wherein Z represents α,β-ethylenically unsaturated monomers, preferably selected from the group consisting of acrylonitrile, allyl acetate, methyl acrylate, methyl methacrylate, stilbene, isostilbene, styrene, norbornene, vinyl acetate, vinyl chloride, vinylidene chloride, vinylpyrrolidone, vinyl ethers having up to 18 carbon atoms, e.g., divinylether, chloroethylvinyl ether;

$R^1$ represents a divalent alkyl group, preferably having up to 10 carbon atoms, more preferably not more than 5 carbon atoms;

$R^2$, $R^3$, and $R^4$ independently represent alkoxy groups having up to about 5 carbon atoms, more preferably not more than about 3 carbon atoms; and $R^5$ represents a substituted or unsubstituted alkyl group, preferably having up to 10 carbon atoms, more preferably not more than 5 carbon atoms, or a substituted or unsubstituted aryl group, preferably having up to 14 carbon atoms.

Suitable substituents for $R^5$ include alkoxy, —OH, —COOH, —COOR, halide, and $—NR_2$, wherein R represents an alkyl group, preferably having up to 5 carbon atoms, more preferably not more than 3.

The relative amounts of the two types of pendant groups in polymer (d) are determined by the relative amounts of compounds (b) and (c) used in the grafting solutions. The molar ratio of compound (c) to compound (b) can be in the range of about 3 to about 6, with the preferred ratio being in the range of about 4 to about 5.

A discussion of the copolymerization of these monomeric units with maleic anhydride and the properties of the resulting copolymers can be found in Brownell, G. L., "Acids, Maleic and Fumaric," in Encyclopedia of Polymer Science and Technology, Vol. 1, John Wiley & Sons, Inc., (New York:1964), pp. 67–95.

It has been found that for certain applications, the properties of the SIPN can be improved if $R^5$ is derived from more than one type of group. For example, if some of the $R^5$ groups are oligomeric polyether groups, the dimensional variability due to varying moisture content of the SIPN can be reduced. This feature is desirable for SIPNs that are to be coated onto flexible substrates such as films, since dimensional changes in the coated layers tend to curl the film.

Additionally, improved properties can be achieved if more than one type of backbone polymer is used. For example, a backbone polymer wherein Z is polymerized from styrene and has one predominant grafted-on pendant group can be combined with a second backbone polymer wherein Z represents methyl vinyl ether and has other grafted-on pendant groups.

Groups that have been found to be particularly useful for $R^5$ include alkoxy-substituted alkyl groups such as $-CH_2CH_2OCH_3$, $CH_2CH_2OC_2H_5$, and $-(CH_2)_3OCH(CH_3)_2$; alkanoic acids such as $-(CH_2)_5COOH$; and multi-hydroxyl substituted alkyl groups such as the group derived from d-glucamine. An oligomeric polyether group that has been found particularly useful for improving dimensional stability is the polyether group:

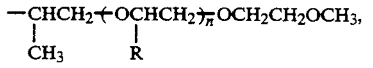

where R represents H or $CH_3$, or both, and n is selected such that the molecular weight of the polyether group is in the range of 600 to 2000.

It is desirable for the amines (b) and (c) in the polymer (d) to be soluble in the solvent medium, both before and after the hydrolysis reaction. Since commonly used solvent media include combinations of methyl ethyl ketone, alcohols, and water, all of which are strongly hydrogen bonding, the incorporation of hydrogen bonding moieties into $R^1$ $R^2R^3R^4$ and $R^5$, is helpful in promoting solubility in the solvent system used.

Reaction (I) can be conveniently carried out by dissolving the copolymer containing maleic anhydride groups (compound (a) in reaction (I)) in methyl ethyl ketone, and, in a separate vessel, dissolving the amines (compounds (b) and (c)) in an alcohol, such as methanol or ethanol, and mixing the two solutions. This reaction proceeds rapidly with agitation at room temperature.

After the grafting reaction has been completed, the hydrolysis reaction can be performed by adding water to the solution and stirring the resulting mixture at room temperature. It has been found that an amount of water approximately equal to the amount of methyl ethyl ketone present in the solution is sufficient to effect hydrolysis at room temperature in about one hour.

Once hydrolysis is complete, the resulting matrix polymer can be crosslinked by removal of water and other solvents from the system, according to the reaction:

(II)

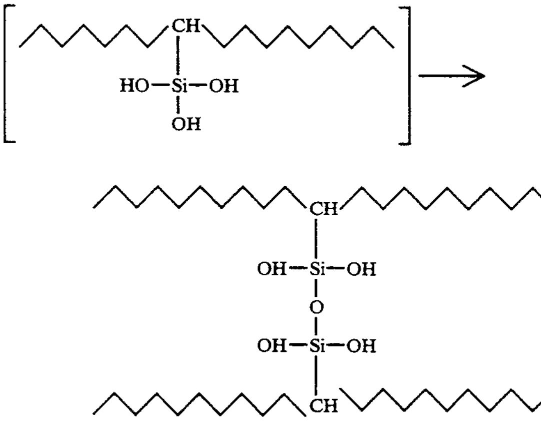

The symbol  represents a polymeric backbone containing a plurality of unsubstituted or substituted $-CH_2-$ groups. Additionally, crosslinking may occur, and often does occur, at more than one of the —OH groups attached to the Si atom.

While it is the primary function of the matrix component of the SIPN to impart physical integrity and durability to the SIPN, it is the primary function of the absorbent component to promote liquid absorbency. When aqueous liquids are to be absorbed, the absorbent component of the SIPN must be water absorbent, and preferably, water soluble. A particularly preferred class of water-soluble polymers is the polyvinyl lactams, the most readily available and economically suitable of which is polyvinyl pyrrolidone.

Copolymers of acrylates and vinyl lactams have also been found useful as absorbent components. For the case where the SIPN is to function primarily as a liquid transmissive medium, and where mechanical durability and low tack are important, a particularly useful absorbent component is polyvinyl alcohol. Alternatively, non-cyclic, amide-containing, water-soluble polymers, such as polyethyl oxazoline, can comprise the absorbent component of the SIPN.

It has further been found that in some cases, a blend of two or more hydrophilic or water-soluble polymers may provide the most desirable combination of properties for the absorbent component. For example, an absorbent component containing a blend of polyvinyl alcohol and polyvinyl pyrrolidone has been found to provide improved adhesion for SIPNs applied as coatings to some solid substrates.

When polyvinyl pyrrolidone is used as the absorbent component of the SIPN and polymer (d) is used as the matrix component of the SIPN, good absorption of aqueous inks is obtained at room temperature if the polyvinyl pyrrolidone comprises at least about 30% by weight of the SIPN, more preferably at least about 50% by weight of the SIPN. Higher absorption can be obtained, at the expense of durability, when polyvinyl pyrrolidone is present in greater amounts. When polyvinyl pyrrolidone comprises more than about 80% of the SIPN, the matrix component is not able to form a complete network, and the entire composition loses its physical integrity when exposed to aqueous liquids.

In cases where the SIPNs of the invention are to be used as liquid-receptive layers borne by solid substrates, as in transparent graphical materials, it is convenient to apply such layers to the substrates by way of liquid solution coatings, which are subsequently dried to form a solid layer. It has been found that the amount of heat required to accomplish the drying in a reasonable time is usually sufficient for causing crosslinking of the matrix component to occur. However, heat is not necessary for crosslinking.

When the matrix polymer is prepared in solution, as described previously, it is convenient to prepare the solution of the absorbent component in a separate vessel and add it to the solution of matrix polymer, thereby forming the SIPN solution blend. In some cases, it may be necessary to combine the solutions in a particular order, so as to assure that the various reactants and products obtained will remain in solution. Experimental methods for determining a suitable order for combining solutions will be apparent to one of ordinary skill in the art.

Coating can be conducted by any suitable means, such as a knife coater, rotogravure coater, reverse roll coater, or other conventional means, as would be apparent to one of ordinary skill in the art. Drying can be accomplished by means of heated air. If preferred, an adhesion promoting priming layer can be interposed between the applied coating and the substrate. Such priming layers can include primer coatings or surface treatments such as corona treatment, or other appropriate treatment as would be apparent to one of ordinary skill in the art. Adhesion of the SIPN layer can also be promoted by interposing a gelatin sublayer of the type used in photographic film backing between the priming layer and the SIPN layer. Particularly useful sublayer compositions are disclosed in European Patent Application No. EP 0 301 827, wherein inorganic oxide particles that have been treated with silanes and coated onto primed polymeric film are stated to be effective as an adhesion promoting sublayer. Film backings having both a priming layer and a gelatin sublayer are commercially available, and are frequently designated as primed and subbed film backings.

It will further be recognized that the SIPN solutions of the present invention may contain additional modifying ingredients such as adhesion promoters, surfactants, viscosity modifiers, and like materials, as would be deemed useful by one of ordinary skill in the art, provided that such additives do not adversely affect the functioning of the invention.

Where the SIPNs of the present invention are to be used to form the ink absorbing layers of films for use in ink-jet printers, it is preferred that the backing of the film have a caliper in the range of about 50 to about 125 micrometers. Films having calipers below about 50 micrometers tend to be too fragile for graphic arts films, while films having calipers over about 125 micrometers tend to be too stiff for easy feeding through many of the imaging machines currently in use. Backing materials suitable for graphic arts films include polyethylene terephthalate, cellulose acetates, polycarbonate, polyvinyl chloride, polystyrene, and polysulfone.

When the SIPNs of the present invention are to be used to form ink absorbing layers of films for ink-jet printing, the SIPN layer may further be overcoated with an ink-permeable anti-tack protective layer, such as, for example, a layer comprising polyvinyl alcohol in which starch particles have been dispersed, or a semi-interpenetrating polymer network in which polyvinyl alcohol is the absorbent component. A further function of such overcoat layers is to provide surface properties which help to properly control the spread of ink droplets so as to optimize image quality.

In addition to the polymeric materials comprising the SIPN, other modifying ingredients, such as surfactants, particles, and other like additives may be added to the formulation for the overcoat layer to improve ink flow, dot spread, or other aspects of ink receptivity for the purpose of improving image appearance.

In order to more fully illustrate the various embodiments of the present invention, the following non-limiting-examples are provided.

EXAMPLE I

The purpose of this example is to illustrate the use of an SIPN of the present invention as a single layer hydrophilic coating that is capable of absorbing aqueous ink.

A solution of the grafting material was prepared by first dissolving 0.07 g of 3-aminopropyltriethoxysilane (Aldrich Chemical Co., Inc.) and 0.22 g of 2-methoxyethylamine (Aldrich Chemical Co., Inc.) in 7.9 g of methanol. In a separate vessel, a solution of the backbone polymer was prepared by dissolving 0.5 g of a copolymer of methyl vinyl ether and maleic anhydride ("Gantrez" AN-169, GAF Chemicals Corporation) in 9.5 g of methyl ethyl ketone. The solutions of the grafting material and the backbone polymer were then combined and stirred to provide a clear, viscous liquid. A solution of the absorbent component was prepared in a separate vessel by adding 1.5 g of polyvinyl pyrrolidone, (K-90, GAF Chemicals Corporation) to 13.5 g of deionized water and stirring the resulting mixture until a clear solution was formed. The solution of the absorbent component, along with 15.0 g of water, was added to the previously prepared combined solutions of the grafting material and the backbone polymer, and the resulting mixture stirred at room temperature until a clear solution was obtained.

An ink-receptive layer was formed by coating the solution so prepared onto a sheet of polyvinylidene chloride-primed (hereinafter PVDC-primed) and gelatin-subbed polyethylene terephthalate film having a caliper of 100 micrometers ("Scotchpar" Type PH primed and subbed film, available from Minnesota Mining and Manufacturing Company) by means of a knife coater adjusted so as to apply a liquid layer having a wet thickness of 125 micrometers. The liquid layer was dried in a forced air oven at a temperature of 90° C. for a period of five minutes.

The ink receptivity of the dried layer was tested by writing on it with a pen which used an aqueous ink ("Expresso" brand pen, Sanford Corp. Bellwood, Ill.). The ink image dried sufficiently in 10 seconds to be non-smearable when gently rubbed with the finger.

It was further noted that the SIPN layer tended to become tacky at relative humidities of about 90% or greater.

EXAMPLE II

The purpose of this example is to illustrate the use of an SIPN of the present invention as an underlayer of an ink-receptive bilayer, and the improvement in drying time that can be achieved by coating the SIPN layer with an overcoat layer comprising a single polymeric coating having starch particles dispersed therein.

A solution for preparing an overcoat layer was prepared by dissolving 0.15 g of polyvinyl alcohol ("Vinol" 540, Air Products and Chemicals, Inc.) and 0.0375 g of xanthan gum ("Keltrol TF" , Kelco Division of Merck & Co., Inc.) in a solvent blend containing 3.37 g of deionized water and 1.44 g of ethanol. In a separate vessel, a slurry containing 5% by weight of starch particles ("Lok-Size" 30 Starch, A. E. Staley Manufacturing Co.) in water was prepared by dispersing the particles, by stirring, in deionized water at room temperature. A 0.5 g quantity of this slurry was added to the solution for preparing the overcoat layer and mixed, at room temperature, until a uniform suspension of starch particles in that solution was obtained.

This solution was then applied over a dried SIPN layer as prepared in Example I by means of a knife coater adjusted so as to apply a liquid layer having a thickness of 75 micrometers. The liquid layer was dried in a forced air oven at a temperature of 90° C. for a period of five minutes.

The resulting ink-receptive bilayer was tested by imaging with a Hewlett-Packard Paintjet color ink-jet printer. Spreading of the ink droplets after striking the ink-receptive layer was within an acceptable range for good image appearance. Drying of the resulting images was tested by contacting the imaged surface with a 12.7 millimeter wide strip of bond paper, gently smoothing the paper over the image with a finger, removing the paper from the imaged surface, and noting whether ink from the image transferred to the paper. This test was performed at time intervals of about one minute, and the time at which detectable ink transfer to the paper ceased was determined to be the drying time.

In a similar manner, the tack time of the imaged surface was measured by means of a strip of PVDC-primed and gelatin-subbed polyethylene terephthalate film ("Scotchpar" Type PH primed and subbed film) having a caliper of about 100 micrometers and a width of about 12.7 millimeters. Tack was detected by placing the strip of film over the imaged area, smoothing it down by gentle rubbing with a finger, pulling the strip away from the surface, and noting whether or not the strip tended to cling to the imaged surface. This test was performed at approximately one minute time intervals, until the strip failed to cling. The time at which clinging ceased was taken to be the tack time.

In the present example, drying time was found to be 30 seconds, and tack time was found to be under four minutes, which were considered to be sufficiently rapid for an ink-jet film intended for use in overhead projection.

It was further noted that tack values at high relative humidities were lower than those for the single layer coating of Example I.

EXAMPLE III

The purpose of this example is to illustrate the formulation of an SIPN of the present invention suitable for use as a water resistant overcoat layer of an ink-receptive bilayer for ink-jet printing.

A solution of the grafting material was prepared by first dissolving 0.22 g of 3-aminopropyltriethoxysilane (Aldrich Chemical Co., Inc.) and 0.7 g of 2-methoxyethylamine (Aldrich Chemical Co., Inc.) in 10.0 g of methanol. In a separate vessel, a solution of the backbone polymer was prepared by dissolving 0.5 g of a copolymer of methyl vinyl ether and maleic anhydride ("Gantrez" AN-169, GAF Chemicals Corporation) in 9.5 g of methyl ethyl ketone. The solution of the grafting material and the solution of the backbone polymer were then combined and stirred until a clear liquid was obtained. A solution of the absorbent component was prepared by dissolving 1.5 g of polyvinyl alcohol ("Vinol" 540, Air Products and Chemicals, Inc.) in 28.5 g of deionized water. The solution of the absorbent component, along with 30.0 g of water, was added to the previously prepared combined solutions of the grafting material and the backbone polymer, and the resulting mixture was stirred until a clear solution was obtained. In a separate vessel, a slurry containing 5% by weight of starch particles ("Lok-Size" 30 Starch, A. E. Staley Manufacturing Co.) dispersed in water was prepared. A 0.5 g quantity of this slurry was added to the solution containing polyvinyl alcohol, grafting material, and backbone polymer. The resulting mixture was stirred until a uniform suspension was obtained.

The suspension so prepared was used to form an overcoat layer over an SIPN layer prepared according to Example I. The suspension was applied by means of a knife coater adjusted so as to apply a liquid layer having a thickness of 75 micrometers. The liquid layer was dried in a forced air oven at a temperature of 90° C. for a period of five minutes.

The resulting ink-receptive bilayer was tested by imaging on a Hewlett-Packard Paintjet color ink-jet printer in the manner described in Example II. Spreading of the ink droplets after striking the ink-receptive layer was acceptable for good image appearance. Drying time was 30 seconds, and tack time was under four minutes, which were considered to be sufficiently rapid for an ink-jet film intended for use in overhead projection. It was further noted that the bilayer could withstand a stream of warm running water having a temperature of 60° C. without being washed off. The overcoat layer of Example II could be washed away under these conditions.

EXAMPLE IV

The purpose of this example is to illustrate how choice of the absorbent component can render the SIPN suitable for use as an absorbent underlayer or as an overcoat layer of an ink-receptive bilayer.

A solution of the grafting material was prepared by dissolving 0.28 g of 3-aminopropyltriethoxysilane (Aldrich Chemical Co., Inc.) and 0.48 g of 2-ethoxyethylamine (Columbia Chemical Co., Inc.) in 5.9 g of methanol. A solution of the backbone polymer was prepared by dissolving 1.0 g of a copolymer of methyl vinyl ether and maleic anhydride ("Gantrez" AN-169, GAF Chemicals Corporation) in 19.0 g of methyl ethyl ketone. The solution of the backbone polymer was added to the solution of the grafting material and the resulting solution stirred for five minutes. To this solution was then added 60.0 g of deionized water to form the solution of matrix polymer.

A solution of the absorbent component was formed by dissolving 3.0 g of polyvinyl pyrrolidone (K-90, GAF Chemicals Corporation) in 27.0 g of deionized water. The solution so prepared was then added to the solution of matrix polymer and the resulting mixture was stirred, at room temperature, for one hour, thereby forming a solution for preparing an SIPN layer.

The underlayer of an ink-receptive bilayer was formed by applying the SIPN solution onto PVDC-primed and gelatin-subbed polyethylene terephthalate film ("Scotchpar" Type PH primed and subbed film) by means of a knife coater adjusted so as to apply a liquid layer having a wet thickness of 100 micrometers. The liquid layer was dried in a forced air oven at a temperature of 90° C. for five minutes.

A solution of the grafting material for the overcoat layer was prepared by dissolving 0.28 g of 3-aminopropyltriethoxysilane (Aldrich Chemical Co., Inc.) and 0.48 g of 2-ethoxyethylamine (Columbia Chemical Co., Inc.) in 5.9 g of methanol. A solution of the backbone polymer for the overcoat layer was prepared by dissolving 1.0 g of a copolymer of methyl vinyl ether and maleic anhydride ("Gantrez" AN-169) in 19.0 of deionized water. The solution of the backbone polymer was then combined with the solution of the grafting material and the resulting mixture stirred for five minutes. The solution of matrix polymer for the overcoat layer was then formed by adding 60.0 g of deionized water to the combined solutions.

A solution of the absorbent component for the overcoat layer was prepared by dissolving 3.0 g of polyvinyl alcohol ("Vinol" 540, Air Products and Chemicals, Inc.) in 57.0 g of deionized water. The solution so prepared was then added to the solution of matrix polymer for the overcoat layer and the resulting solution stirred for one hour, thereby forming a solution for preparing an SIPN layer for the overcoat layer.

A bilayer was formed by coating the SIPN solution for the overcoat layer over the previously formed underlayer, using a knife coater adjusted to apply a liquid layer having a wet thickness of 75 micrometers. The coating so formed was dried in a forced air oven at a temperature of 90° C. for five minutes.

The bilayer was clear, and images printed by means of a Hewlett-Packard Paintjet color ink-jet printer exhibited both drying and tack times in the range of three to four minutes. It was noted that the coated polyethylene terephthalate film exhibited a tendency to curl up when placed on the lighted stage of an overhead projector, but that this tendency was greatly reduced if the bilayer described in this example was applied to both sides of the polyethylene terephthalate film.

Comparative Example A

The purpose of this example is to illustrate the difference between a liquid-transmissive layer and a liquid-absorbent layer, by showing how a layer that is satisfactory as a liquid-transmissive layer may be unsatisfactory when used as a liquid-absorbent monolayer.

The SIPN solution for the overcoat layer that was prepared in Example IV was applied directly onto PVDC-primed and gelatin-subbed polyethylene terephthalate film having a caliper of 100 micrometers ("Scotchpar" Type PH primed and subbed film) by means of a knife coater adjusted to apply a liquid layer having a wet thickness of 125 micrometers. The liquid layer was dried in a forced air oven at a temperature of 90° C. for five minutes.

When the coated film was imaged on the Hewlett-Packard Paintjet color ink-jet printer, the ink beaded up and failed to dry in five minutes.

Comparative Example B

The purpose of this example is to illustrate the adverse effect upon polymer compatibility, SIPN clarity, and ink receptivity of a bilayer of using a matrix polymer having pendant groups that are not selected according to the present invention in an SIPN used as the overcoat layer of a bilayer coating.

A solution of the grafting material was prepared by dissolving 0.7 g of 3-aminopropyltriethoxysilane (Aldrich Chemical Co., Inc.) and 0.41 g of octylamine (Aldrich Chemical Co., Inc.) in 10.0 g of methanol. A solution of the backbone polymer was prepared in a separate vessel by dissolving 1.0 g of a copolymer of methyl vinyl ether and maleic anhydride ("Gantrez" An-169, GAF Chemicals Corporation) in 19.0 g of methyl ethyl ketone. The solution of the backbone polymer was combined with the solution of the grafting material and the resulting solution was stirred until uniform.

A solution of the absorbent component was prepared by dissolving 3.0 g of polyvinyl alcohol ("Vinol" 540, Air Products and Chemicals, Inc.) in 57.0 g of deionized water. This solution was then added to the combined solution of the backbone polymer and the grafting material and the resulting solution mixed, thereby forming a solution for preparing an SIPN layer. A hazy solution resulted, indicating a lack of compatibility between the components of the solution.

A bilayer coating was formed by applying the SIPN solution of this example over an ink-receptive coating prepared according to Example I by means of a knife coater adjusted to apply a liquid layer having a wet thickness of 100 micrometers. The liquid layer so coated was dried by means of a forced air oven at a temperature of 95° C. for five minutes.

The resulting bilayer exhibited significant haze, and ink receptivity was poor.

Comparative Example C

The purpose of this example is to illustrate the adverse effect that incompatible polymers in the absorbent component of the underlayer and of the overcoat layer can have upon the haze levels in bilayer coatings formed from SIPNs prepared according to this invention, even though the only area of contact between the underlayer and the overcoat layer is at the interface between the two layers of the bilayer coating.

A solution of the grafting material for the underlayer was prepared by dissolving 0.28 g of 3-aminopropyltriethoxysilane (Aldrich Chemical Co., Inc.) and 0.45 g of ethoxyethylamine (Columbia Chemical Co., Inc.) in 5.9 g of methanol. A solution of the backbone polymer for the underlayer was prepared by dissolving 1.0 g of a copolymer of methyl vinyl ether and maleic anhydride ("Gantrez" AN-169, GAF Chemicals Corporation) in 19.0 g of methyl ethyl ketone. The solution of the backbone polymer was added to the solution of the grafting material and the resulting solution stirred for five minutes. The solution of matrix polymer for the underlayer was then formed by adding 60.0 g of deionized water to the previously combined solutions.

A solution of the absorbent component was prepared by dissolving 3.0 g of polyethyl oxazoline (PEOX, High Molecular Weight Grade, The Dow Chemical Company) in 15.0 g of deionized water. The solution so prepared was then added to the solution of matrix polymer and the resulting mixture was stirred, at room temperature, for one hour, thereby forming a solution for the underlayer.

The underlayer of an ink-receptive bilayer coating was formed by applying the SIPN solution for the underlayer onto PVDC-primed and gelatin-subbed polyethylene terephthalate film ("Scotchpar" Type PH primed and subbed film) by means of a knife coater adjusted to apply a liquid layer having a thickness of 100 micrometers. Drying was conducted in a forced air oven at a temperature of 90° C. for five minutes.

A solution of the grafting material for the overcoat layer was prepared by dissolving 0.28 g of 3-aminopropyltriethoxysilane (Aldrich Chemical Co., Inc.) and 0.48 g of ethoxyethylamine (Columbia Chemical Co., Inc.) in 5.9 g of methanol. A solution of the backbone polymer for the overcoat layer was prepared by dissolving 1.0 of a copolymer of methyl vinyl ether and maleic anhydride ("Gantrez" AN-169, GAF Chemicals Corporation) in 19.0 g of methyl ethyl ketone. The solution of the backbone polymer was then combined with the solution of the grafting material and the resulting solution stirred for five minutes. The solution of matrix polymer was then formed by adding 60.0 g of deionized water to the combined solutions.

A solution of the absorbent component was prepared by dissolving 3.0 g of polyvinyl alcohol ("Vinol" 540, Air Products and Chemicals, Inc.) in 60 g of water. The solution so prepared was then added to the solution of matrix polymer and the combined solutions were stirred for one hour, thereby forming a solution for the overcoat layer.

A bilayer coating was formed by applying the SIPN solution for the overcoat layer over the previously coated underlayer by means of a knife coater adjusted to apply a liquid layer having a wet thickness of 75 micrometers. Drying was conducted in a forced air oven at a temperature of 90° C. for five minutes.

The bilayer coating exhibited a high level of haze, even though the individual layers, when coated separately onto PVDC-primed and gelatin-subbed polyethylene terephthalate film ("Scotchpar" Type PH primed and subbed film) did not exhibit haze.

EXAMPLE V

The purpose of this example is to illustrate the use of an aminoalkanoic acid as a pendant group for a matrix polymer in an SIPN of the present invention that is particularly resistant to becoming tacky when used as an overcoat layer in an ink-receptive bilayer coating.

A solution of the grafting material was prepared by dissolving 0.7 g of 3-aminopropyltriethoxysilane (Aldrich Chemical Co., Inc.) and 0.42 g of 6-aminocaproic acid (Aldrich Chemical Co., Inc.) in a blend containing 4.0 g of water and 7.0 g of methanol. In a separate vessel, a solution of the backbone polymer was prepared by dissolving 1.0 g of a copolymer of methyl vinyl ether and maleic anhydride ("Gantrez" AN-169, GAF Chemicals Corporation) in 19.0 g of methyl ethyl ketone. The solution of the grafting material and the solution of the backbone polymer were combined and the resulting solution mixed for not more than five minutes. It was found that longer mixing times caused the solution to gel and become insoluble. A solution of the absorbent component was prepared by dissolving 3.0 g of polyvinyl alcohol ("Vinol" 40, Air Products and Chemicals, Inc.) in 57.0 g of deionized water. The solution of the absorbent component was then added to the combined solution of the backbone polymer and the grafting material, along with 60.0 g of water, and the resulting mixture stirred to form an SIPN solution.

The SIPN solution so prepared was used to form an overcoat layer by coating it over a dried underlayer such as that prepared in Example I by means of a knife coater adjusted so as to apply a liquid layer having a thickness of 100 micrometers. The liquid layer was then dried in a forced air oven at a temperature of 90° C. for five minutes.

Ink receptivity was found to be good, and the ink-receptive layer was found to be particularly resistant to becoming tacky at high humidities.

EXAMPLE VI

The purpose of this example is to illustrate the improvement in dimensional stability of SIPNs of the present invention that can be achieved when suitably chosen oligomeric chains are grafted onto the matrix polymer.

A solution of the grafting material was prepared by dissolving 1.0 g of polyoxyalkyleneamine ("Jeffamine" M-1000, Texaco Chemical Co.) in 10.0 g of methyl ethyl ketone. In a separate vessel, a solution of the backbone polymer was prepared by dissolving 2.0 g of a copolymer of methyl vinyl ether and maleic anhydride ("Gantrez" AN-139, GAF Chemicals Corporation) in 18.0 g of methyl ethyl ketone. The solution of the backbone polymer was then poured into the solution of the grafting material and the resulting solution mixed to form a solution containing a backbone polymer having pendant oligomeric groups. In a separate vessel, a solution of another grafting material was prepared by dissolving 0.28 g of 3-aminopropyltriethoxysilane (Aldrich Chemical Co., Inc.) and 1.0 g of 3-isopropoxypropylamine (Aldrich Chemical Co., Inc.) in 10.0 g of methanol. The solution of backbone polymer having pendant oligomeric groups was then mixed with the solution containing the other grafting material, and 50.0 g of water were then added to the combined solutions. The resulting solution was mixed until a homogeneous, clear solution was formed. An SIPN solution was then prepared by adding to the homogeneous solution just prepared 15.0 g of a 20% by weight solution of a copolymer of dimethylaminoacrylamide and vinyl pyrrolidone in water (Copolymer 845, GAF Chemicals Corporation). This addition was followed by stirring at room temperature until mixing was complete.

A transparent ink-receptive layer was formed by coating the SIPN solution onto PVDC-primed and gelatin-subbed polyethylene terephthalate film having a caliper of 100 micrometers ("Scotchpar" Type PH primed and subbed film) by means of a knife coater adjusted so as to apply a liquid layer having a wet thickness of 125 micrometers, followed by drying in a forced air oven at a temperature of 90° C. for five minutes.

Though some curl still occurred, it was less than for other SIPN layers that utilized Copolymer 845 as the absorbent component but did not employ the backbone polymer with pendant oligomeric groups. Attempts at incorporating higher levels of oligomer in order to further eliminate curl resulted in gelling of the solution of backbone polymer, as illustrated in Comparative Example D.

EXAMPLE VII

The purpose of this example is to illustrate the improvement in dimensional stability of SIPNs of the present invention used in ink-receptive layers that can be achieved when two matrix polymers having pendant oligomeric groups are used.

A solution of a grafting material was prepared by dissolving 2.0 g of polyoxyalkyleneamine ("Jeffamine" M-1000, Texaco Chemical Co.) in 18.0 g of methyl ethyl ketone. A first solution of a backbone polymer was prepared by dissolving 0.5 g of a copolymer of styrene and maleic anhydride ("Scripset 540", Monsanto) in 4.5 g of methyl ethyl ketone. The solution of the grafting material was added to the first solution of a backbone polymer and the resulting solution stirred for 15 minutes at room temperature. A second solution of a backbone polymer was prepared by dissolving 2.0 g of a copolymer of methyl vinyl ether and maleic anhydride ("Gantrez" AN-139, GAF Chemicals Corporation) in 18.0 g of methyl ethyl ketone. The solution so prepared was added to the first solution of backbone polymer and the resulting solution was stirred for five minutes. This solution is hereinafter referred to as combined Solution A.

A solution of another grafting material was prepared by dissolving 0.3 g of 3-aminopropyltriethoxysilane (Aldrich Chemical Co., Inc.) in 5.0 g of methyl ethyl ketone. The solution so prepared was added to the previously prepared combined Solution A and the resulting solution stirred for five minutes. This solution is hereinafter referred to as combined Solution B. A solution of another grafting material was prepared by dissolving 1.3 g of isopropoxypropylamine (Aldrich Chemical Co., Inc.) in 50.0 g of methanol. The previously prepared combined Solution B was then poured into the solution of isopropoxypropylamine grafting material and the resulting solution stirred for five minutes.

The resulting combined solution was then diluted with 200 g of deionized water and placed in a vacuum chamber in order to reduce the amount of methyl ethyl ketone and methanol present in the solution to provide a solution of matrix polymer in which water was the primary solvent.

A first solution of an absorbent component was prepared by dissolving 1.0 g of polyvinyl pyrrolidone (K-90, GAF Chemicals Corporation) in 9.0 g of deionized water. A second solution of an absorbent component was prepared by dissolving 1.0 g of polyvinyl alcohol ("Vinol" 540, Air Products and Chemicals, Inc.) in 19.0 g of deionized water. A third solution of an absorbent component was prepared by weighing out 5.0 g of a 20% by weight solution of a copolymer of dimethylaminoacrylamide and vinyl pyrrolidone in water (Copolymer 845, GAF Chemicals Corporation). The solutions of absorbent component so prepared were each mixed with a 20.0 g portion of the solution of matrix component, so as to produce three separate SIPN solutions which differed only in the identity of the absorbent components used.

Each of the three SIPN solutions was applied onto PVDC-primed and gelatin-subbed polyethylene terephthalate film having a caliper of 100 micrometers ("Scotchpar" Type PH primed and subbed film) by means of a knife coater adjusted so as to apply a liquid layer having a wet thickness of 125 micrometers. Drying was conducted by means of a forced air oven at a temperature of 100° C. for five minutes.

In the case of all three absorbent components, ink dry time using a Sanford Expresso pen was less than five seconds, and very little curl occurred.

Comparative Example D

The purpose of this example is to illustrate the limitation on the degree of incorporation of oligomeric material that can be grafted onto a methyl vinyl ether maleic anhydride backbone polymer, and the adverse effects that occur when too much oligomeric material is grafted onto this backbone polymer. This example is to be compared with Example VII, in which higher levels of oligomeric material were grafted onto styrene maleic anhydride copolymer without gelling of the solution.

A solution of the grafting material was prepared by dissolving 2.0 g of polyoxyalkyleneamine ("Jeffamine" M-1000, Texaco Chemical Co.) in 20.0 g of methyl ethyl ketone. A solution of the backbone polymer was prepared by dissolving 2.0 g of a copolymer of methyl vinyl ether and maleic anhydride ("Gantrez" AN-139, GAF Chemicals Corporation) in 18.0 g of methyl ethyl ketone. The solution of the grafting material and the solution of the backbone polymer were combined, and the mixture gelled almost immediately.

EXAMPLE VIII

The purpose of this example is to illustrate the use of quaternized amine pendant groups in a matrix polymer for SIPNs of the present invention, and the improved humidity and fingerprint resistance that can be achieved when this material is used.

A solution of a grafting material was prepared by dissolving 1.5 g of polyoxyalkyleneamine ("Jeffamine" M-1000, Texaco Chemical Co.) in 13.5 g of methyl ethyl ketone. A first solution of a backbone polymer was prepared by dissolving 0.5 g of a copolymer of styrene and maleic anhydride ("Scripset" 540, Monsanto) in 4.5 g of methyl ethyl ketone. The solution of the grafting material was added to the first solution of backbone polymer and the resulting solution stirred for 15 minutes.

In a separate vessel, a second solution of a backbone polymer was prepared by dissolving 2.0 g of a copolymer of methyl vinyl ether and maleic anhydride ("Gantrez" AN-169, GAF Chemicals Corporation) in 18.0 g of methyl ethyl ketone. The solution so prepared was added to the first solution of backbone polymer and the resulting solution stirred for five minutes.

A solution of a grafting material was prepared by dissolving 0.3 g of aminopropyltriethoxysilane (Aldrich Chemical Co., Inc.) in 5.0 g of methyl ethyl ketone. A second solution of a grafting material was prepared by dissolving 1.2 g of 3-dimethylaminopropylamine (Aldrich Chemical Co., Inc.) in a blend of solvents containing 20.0 g of methanol and 235.0 g of deionized water. The first solution of grafting material was added to the combined solutions of backbone polymer and the resulting solution stirred for five minutes. The solution so prepared was then poured into the second solution of grafting material, to form a solution of matrix polymer.

A solution of the absorbent component was prepared by dissolving 10.0 g of polyvinyl alcohol ("Vinol" 540, Air Products and Chemicals) in 190.0 g of deionized water. The solution so prepared was then mixed with the solution of matrix polymer. To this mixture of solutions was then added 15.0 g of 1N HCl, and the resulting solution was stirred until mixing was complete (about 5 to 10 minutes), thereby forming a quaternized SIPN solution.

A transparent ink-receptive coating was formed by coating the quaternized SIPN solution onto a primed polyethylene terephthalate film which had been coated with an adhesion promoting sublayer containing silica particles and silanol adhesion promoters, as described in European Patent Office Application No. EP 0 301 827. The film had a caliper of 75 micrometers. Coating was carried out by means of a knife coater adjusted to apply a liquid layer having a wet thickness of 125 micrometers. The liquid layer was then dried in a forced air oven at a temperature of 100° C. for five minutes.

Drying time and tack time were good, and the layer was tack free even at a humidity of 90%. The dried coating was very resistant to fingerprints, and those fingerprints that did occur could be easily wiped off with gentle rubbing. When subjected to the tape coating adhesion test described in ASTM D 3359-87, some coating material was removed by the tape, indicating limited adhesion of the coating to the substrate.

When the SIPN solution was not quaternized, the solution formed a hazy coating.

EXAMPLE IX

The purpose of this example is to illustrate the use of a blend of polymers for the absorbent component to improve the adhesion of a coating formed from an SIPN of the present invention.

A first solution of an absorbent component was prepared by dissolving 10.0 g of polyvinyl alcohol ("Vinol" 540, Air Products and Chemicals, Inc.) in 190.0 g of deionized water. A second solution of an absorbent component was prepared by dissolving 2.0 g of polyvinyl pyrrolidone (K-90, GAF Chemicals Corporation) in 18.0 g of deionized water.

A solution of matrix polymer was prepared as in Example VII, and combined with each of the first and second solutions of absorbent component of this example. To the resulting combined solution was added 15.0 g of 1N HCl, and the resulting mixture was stirred at room temperature until a uniform solution was obtained.

A transparent ink-receptive layer was formed by coating the SIPN solution onto primed polyethylene terephthalate film having a caliper of 75 micrometers that had previously been coated with an adhesion promoting sublayer comprising silica particles and silanol adhesion promoters, as described in European Patent Application No. EP 0 301 827. Coating was carried out by means of a knife coater adjusted to apply a liquid layer having a wet thickness of 125 micrometers. The liquid layer was then dried in a forced air oven at a temperature of 100° C. for five minutes.

Image performance and durability were similar to that of the coated film in Example VII, but the SIPN layer showed improved adhesion to the film. The coating did not pull off when subjected to the "Scotch" Tape test, which is performed by cutting lines in the coating in a crosshatched pattern, placing the end of a strip of "Scotch" Magic Mending Tape over the crosshatched area, firmly pressing the tape down onto the film, and quickly pulling it off. Failure of coating adhesion is indicated by the coating being pulled off with the tape. This test is fairly severe, and it was found that the coating of Example VII was pulled off in this test.

This example illustrates how adhesion of the SIPN layer can be improved by suitable formulation of the absorbent component, in particular, how SIPNs containing a blend of polyvinyl alcohol and polyvinyl pyrrolidone can exhibit better adhesion to some substrates than do SIPNs having only polyvinyl alcohol as the absorbent component.

Comparative Example E

The purpose of this example is to illustrate the superiority of the primary amine groups relative to secondary amine groups as grafting materials.

A solution of the grafting material was prepared by dissolving 0.14 g of 3-aminopropyltriethoxysilane (Aldrich Chemical Co., Inc.) and 0.70 g of bis(methoxyethylamine) (BASF) in a solvent blend containing 10.0 g of methyl ethyl ketone and 10.0 g of methanol. In a separate vessel, a solution of the backbone polymer was prepared by dissolving 1.0 g of a copolymer of methyl vinyl ether and maleic anhydride ("Gantrez" AN-169, GAF Chemicals Corporation) in 19.0 g of deionized water. The solution of the grafting material and the solution of the backbone polymer were then combined and the resulting solution stirred to produce a clear, viscous liquid. A solution of the absorbent component was prepared by adding 3.0 g of polyvinyl pyrrolidone (K-90, GAF Chemicals Corporation) to 27.0 g of deionized water and stirring the resulting mixture until a clear solution was obtained. The solution of the absorbent component, along with 20.0 g of deionized water, was added to the previously prepared combined solution of the grafting material and the backbone polymer, and the resulting mixture was stirred at room temperature until a clear solution was obtained.

An ink-receptive layer was formed by applying the solution so prepared onto a sheet of PVDC-primed and gelatin-subbed polyethylene terephthalate film ("Scotchpar" Type PH primed and subbed film) by means of a knife coater adjusted so as to apply a liquid layer having a wet thickness of 150 micrometers. The liquid layer was dried in a forced air oven at a temperature of 100° C. for a period of five minutes. When this ink-receptive layer was imaged by means of an ink-jet printer, the ink tended to bead up on the surface and give an image of poor quality and a long drying time.

Various modifications and alterations of this invention will become apparent to those skilled in the art without departing from the scope and spirit of this invention, and it should be understood that this invention is not to be unduly limited to the illustrative embodiments set forth herein.

What is claimed is:

1. A transparent film comprising a transparent backing bearing on at least one major surface thereof a layer formed from a liquid-absorbent composition consisting essentially of:

(a) a polymeric matrix component comprising crosslinked silanol moieties said silanol moieties being in pendant groups of said matrix component and (b) an uncrosslinked liquid-absorbent component comprising at least one water-absorbent polymer.

2. The transparent film of claim 1, wherein said water-absorbent polymer is water-soluble.

3. The transparent film of claim 1, wherein said silanol moieties are located in pendant groups of said matrix component.

4. The transparent film of claim 2, wherein amide groups are present in said water-soluble polymer.

5. The transparent film of claim 2, wherein said water-soluble polymer contains vinyl lactam groups.

6. The transparent film of claim 5, wherein said vinyl lactam is polyvinyl pyrrolidone.

7. The transparent film of claim 2, wherein said water-soluble polymer is polyvinyl alcohol.

8. The transparent film of claim 1, wherein said matrix polymer has the structure:

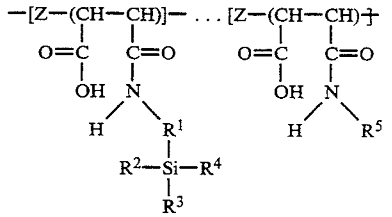

wherein z represents a monomeric unit selected from the group consisting of acrylonitrile, allyl acetate, methyl acrylate, methyl methacrylate, methyl and higher alkyl vinyl ethers, stilbene, isostilbene, styrene, vinyl acetate, vinyl chloride, vinyl ethers have up to 18 carbon atoms, vinylpyrrolidone, divinylether, norbornene, chloroethylvinyl ether, and vinylidene chloride;

$R^1$ represents a divalent alkyl group;

$R^2$, $R^3$, and $R^4$ independently represent alkoxy groups having up to 5 carbon atoms; and $R^5$ represents a substituted or unsubstituted alkyl group or a substituted or unsubstituted aryl group.

9. The transparent film of claim 8, wherein

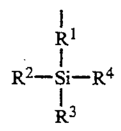

represents a propyltriethoxysilane group.

10. The transparent film of claim 8, wherein $R^5$ represents a methoxyethyl group.

11. The transparent film of claim 8, wherein $R^5$ represents a methoxypropyl group.

12. The transparent film of claim 8, wherein $R^5$ represents an ethoxyethyl group.

13. The transparent film of claim 8, wherein $R^5$ represents a 6-caproic acid group.

14. The transparent film of claim 8, wherein $R^5$ represents a polyoxyalkylene group.

15. The transparent film of claim 8, wherein $R^5$ represents an isopropoxypropyl group.

16. The transparent film of claim 1, wherein said crosslinked polymer comprises at least 20% by weight of the composition.

17. A film according to claim 1, wherein said layer is further overcoated with an ink-permeable anti-tack protective layer.

18. A transparent film comprising a transparent backing bearing on at least one major surface thereof a layer from a liquid-absorbent composition consisting essentially of:

(a) a polymeric matrix component comprising crosslinked silanol moieties, said silanol moieties being in pendant groups of said matrix component, said polymeric matrix component having the structure

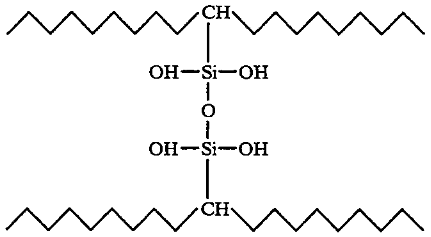

wherein the symbol  represents a polymeric backbone containing a plurality of unsubstituted or substituted $—CH_2—$ groups, and (b) an uncrosslinked liquid-absorbent component comprising at least one water-absorbent polymer.

* * * * *